United States Patent [19]
Lawhead et al.

[11] 3,711,359

[45] Jan. 16, 1973

[54] MAGNETIC CARD STRIPE PRINTER

[75] Inventors: Robert E. Lawhead, William E. Steele, both of San Jose, Calif. 95114

[73] Assignee: International Business Machines Corp., Armonk, N.Y.

[22] Filed: May 11, 1970

[21] Appl. No.: 36,148

[52] U.S. Cl. ....................156/583, 156/515, 156/380

[51] Int. Cl. ..........................B32b 31/20, B32b 31/26

[58] Field of Search ...............156/380, 580, 583, 515

[56] References Cited

UNITED STATES PATENTS

| | | | |
|---|---|---|---|
| 2,729,270 | 1/1956 | Prenveille et al. | 156/583 |
| 3,567,560 | 3/1971 | Stiff | 156/583 |
| 3,547,743 | 12/1970 | Tunner | 156/583 |
| 3,484,325 | 12/1969 | Pendleton | 156/583 X |

*Primary Examiner*—Benjamin A. Borchelt
*Assistant Examiner*—James M. Hanley
*Attorney*—Hanifin and Jancin and Shelley M. Beckstrand

[57] ABSTRACT

An apparatus for applying a precisely controlled pressure and temperature to a work station. A hot punch comprises first and second heating elements and a thermistor. The first element operates at a fixed voltage and the second element operates at a voltage responsive to said thermistor. A clutch and cam arrangement actuates the hot punch and controls pressure time. An air spring applies a constant force against said hot punch for controlling the pressure at the work station.

7 Claims, 4 Drawing Figures

*INVENTORS*
ROBERT E. LAWHEAD
WILLIAM E. STEELE

*BY* [signature]
ATTORNEY

A

MAGNETIC CARD STRIPE PRINTER

BACKGROUND OF THE INVENTION

1. Field of the Invention

The invention relates to an apparatus for applying a uniform temperature and pressure for a controlled time to a bonding station for transfer coating a magnetic stripe from a carrier to a substrate.

2. Description of the Prior Art

An identification or credit authorization system based upon a machine and human readable, magnetic, printed and embossed identification card presents many advantages.

One severe problem, however, is the preparation of such a card with a magnetic stripe, for encoding the machine readable data, that is mechanically and magnetically acceptable. Such stripes may be provided on a plastic substrate by many processes known to the art, each with severe limitations in terms of process and product characteristics repeatability, throughput, failure rate. For example, such stripes may be prepared by deposition, coating or wet striping or painting, or by transfer coating from a carrier to the substrate, etc.

The latter process, transfer coating, appears to offer the best solution. In this process, a standard "Mr." size credit card, with the logo in place and, possibly, with the card embossed, is used as the base, or substrate. Standard computer or recording tape with, for example, a magnetic oxide coating on a Mylar carrier is brought in contact with the card under controlled conditions of pressure, temperature, and time. After a cooling period, the card and tape are separated, leaving a transferred stripe of magnetic material on the card.

In one prior art device for such or similar stamping processes, the heated platen comprises a cartridge heating element in a cast aluminum block, with a steel plate mounted to said block, and with the stamp tool or hot die glued to the plate. A pneumatic actuator, through a double toggle eccentric, controls the stamping pressure and time, while the heating element controls the temperature.

In other hot stamp devices, air cylinders or pistons are utilized for directly actuating the hot die.

The above devices all suffer from lack of precise control of the stamping pressure, temperature, and time, and also operate at a speed too slow for mass production of cards in significant volume for use in retail systems.

For example, to prepare a magnetic stripe on a vinyl substrate (or credit card) by transfer stamping from a certain type of magnetic coated Mylar tape requires pressure of approximately 40 ± 1 psi, temperature of approximately 350 ± 2° F, and a pressure time of approximately 25 to 50 ± 10 milliseconds. These process conditions are required to melt about 1 mil in depth of card surface by heat passed through the tape with minimal disturbance to the balance of the thickness of the plastic or vinyl card. The prior art devices above noted have been unable to achieve these process limits. In addition, because of heat conduction problems, it has been found impossible with these devices to rapidly repeat the stamping operation (at, say, 5,000 operations per hour or more) inasmuch as the hot die does not recover its temperature between operations.

SUMMARY OF THE INVENTION

It is therefore an object of the invention to provide an improved hot stamping apparatus.

It is a further object of the invention to provide an apparatus for applying a precisely controlled pressure and temperature at a work station.

It is a further object of the invention to provide an improved apparatus for preparation of magnetic identification cards where the magnetic stripe is applied to a substrate with precisely controlled pressure and temperature and time.

It is a further object of the invention to provide an improved apparatus for maintaining a hot die at a uniform temperature for rapid repetition of hot stamping operations.

The magnetic stripe printer of the invention comprises an anvil, a hot stamp, an air spring, and a cam and clutch. The hot stamp includes first and second heating elements and a thermistor mounted in heat retarding and heat conducting portions. The first heating element operates at a fixed voltage and the second heating element operates at a voltage responsive to said thermistor. The clutch operates a cam which permits the hot stamp to travel to the work station with the full force of the pressure in the air spring.

The foregoing and other objects, features and advantages of the invention will be apparent from the following more particular description of a preferred embodiment of the invention, as illustrated in the accompanying drawings.

DESCRIPTION

Figure 1:
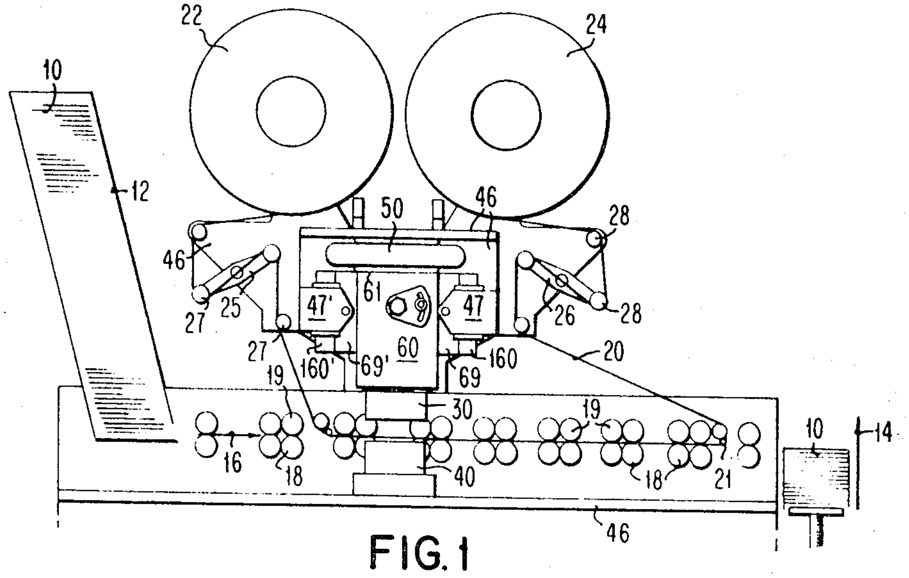
FIG. 1 is a schematic view showing the card and tape paths, the stamp or punch housing, the anvil, and the air spring.

Identification cards, such as standard "Mr." size credit cards which have been embossed and contain the logo, are fed from hopper 12 along path 16 between rollers 18 and 19 to hopper 14 where they are stacked. A web of magnetic material comprising a magnetic coating on a substrate, such as Mylar, is fed from supply roller 22 to takeup roller 24, being wound about rollers 27 and 28 in the manner shown. Tensioning arms 25 and 26 are each rotatably mounted to base 46 and carry rollers 27 and 28, respectively, for controlling the tension in tape 20 as it passes from the supply roller 22 to takeup roller 24. The tape 20 and card 10 come together at the work station between hot punch 30 and anvil 40. At the bonding station, the card 10 and tape 20 are pressed together at a controlled temperature and pressure for a controlled period of time. Magnetic tape 20 is positioned on top of card 10, with the magnetic layer of the tape next to the card. The hot punch 30 is lowered to apply pressure to anvil 40 through the card and tape. Anvil 40 compensates for card or tape thickness variations, non-parallelism, etc., such that the top surface of card 10 is held parallel to the bottom surface of punch 30. Heat is transferred from hot punch 30 through tape 20 to melt just approximately 1 mil of depth of top surface of card 10, whereupon the pressure is released. Thereafter, the card 10 and tape 20 travel together through rollers 18 and 19 until they reach guide roller 21, at which point tape 20 is stripped away from card 10 leaving behind a stripe of magnetic material on card 10, said stripe comprising an area corresponding to the dimensions of the area between stamp 30 and anvil 40 which was subjected to said control temperature and pressure (i.e., the surface of the hot die 32).

Hot stamp or punch 30 is fixedly mounted to punch housing or ram 60. Linear bearing shafts 160 and 160′ are fixedly attached to the ram 60 by web 69 and 69′, respectively. The shafts 160 and 160′ are mounted within bearings 47 and 47′, said bearings being fixedly attached to base 46. Air spring 50 is mounted between base 46 and ram 60, such that as the ram 60 moves in a vertical direction, a constant force is exerted against the pressure surface 61 on said ram by said air spring. As the ram moves in a vertical direction, shafts 160 and 160′ travel in a vertical direction within linear bearings 47 and 47′, respectively.

HOT STAMP MEANS

Figure 2:
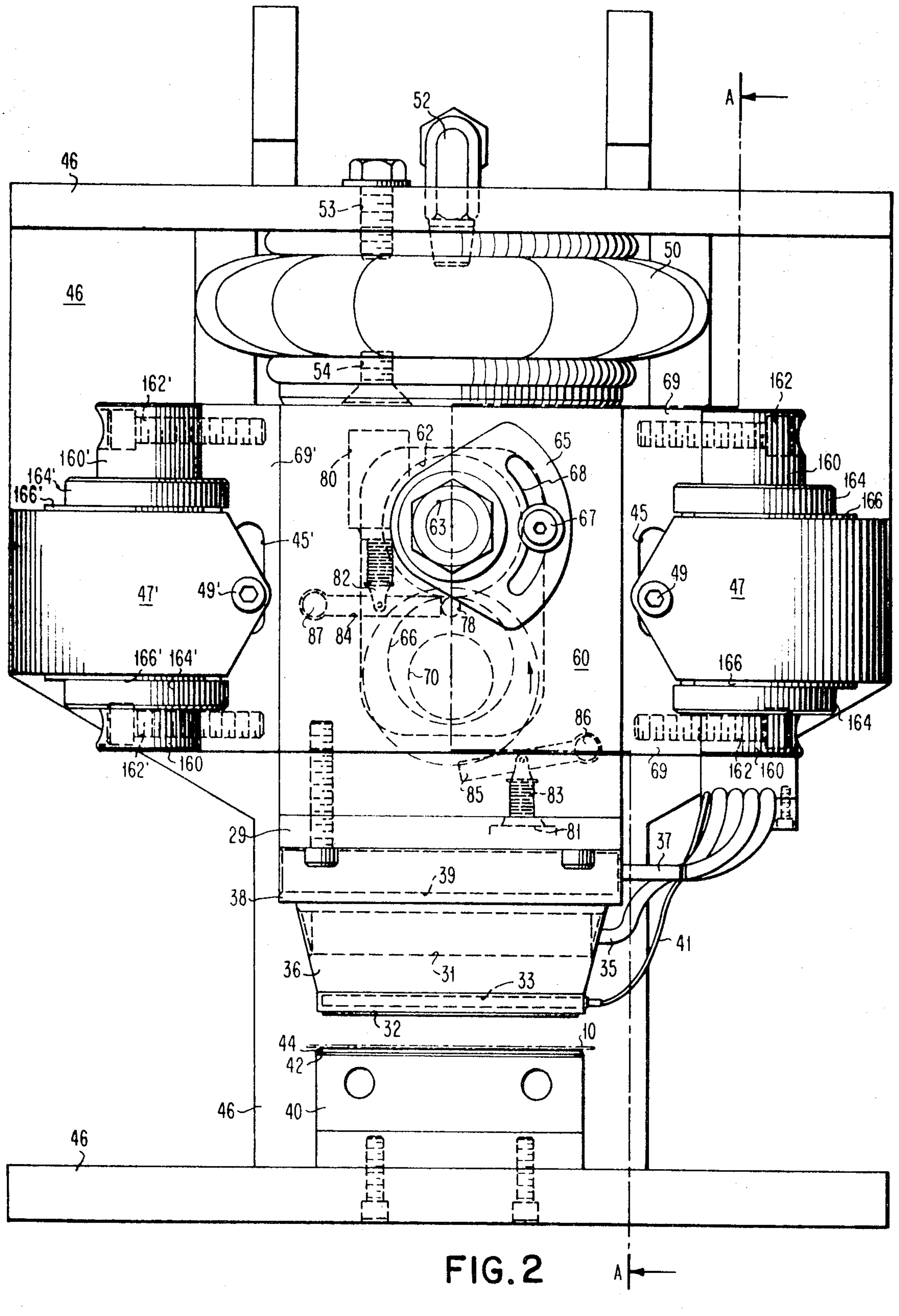
FIG. 2 is a front view showing in greater detail the punch and anvil, the punch housing, and the base and air springs.
Figure 4:
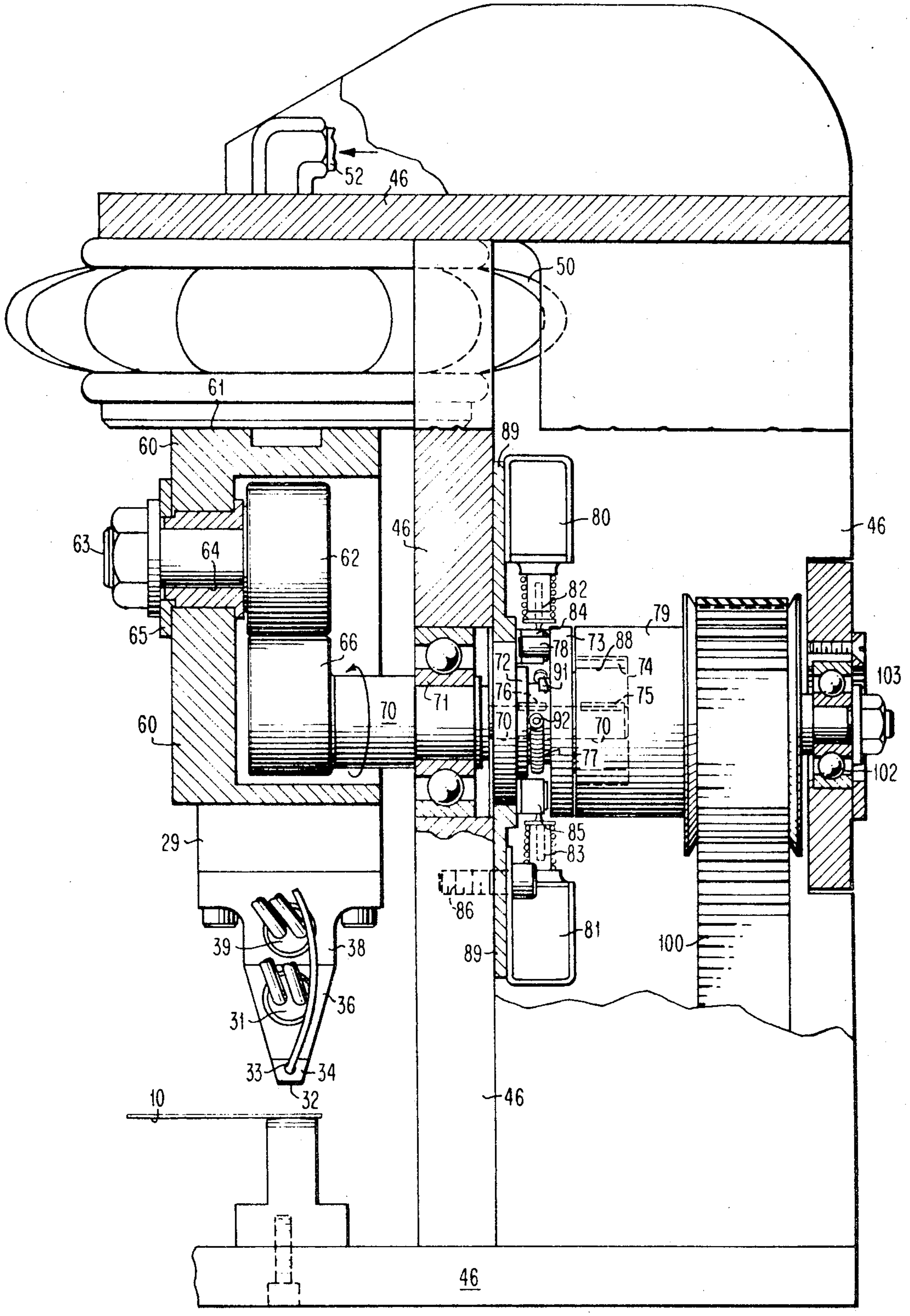
FIG. 4 is a side view of the apparatus taken along lines AA of FIG. 2, and showing a preferred cam drive and clutch in greater detail.

Referring now to FIGS. 2 and 4, the hot stamp punch or anvil 30 in FIG. 1 will be described in greater detail. Herein, hot anvil 30 comprises a unitary structure of five sections: hot die 32, heat conductor 34, heat conductor 36, heat retarder 38, and insulator 29. Hot die 32 is of a very hard material for wear resistance. Heat conductors 34 and 36 are shown as separate layers, but may be one layer or portion. Essential elements to achieve the best heat conducting characteristics are a heat retarding section 38 and a heat conducting section 34, 36. Anvil 30 is attached to the punch housing 60. Mounted in heat retarder 38 is heating element 39, and mounted in heat conductor 36 is heating element 37, and mounted in conductor 34 is thermistor 33. Heating element 31 and 39 are conventional resistance heaters, and are attached to their voltage supplies (not shown) by lines 35 and 37, respectively. Thermistor 33 is attached to its controller (not shown) by control line 41. Said lines 41, 35, and 37 are attached to the bottom of linear bearing shaft 160 to avoid flexing during vertical movement of the anvil 30. Hot die 32 may be of a very hard beryllium copper, conductor 36 may be of copper, and heat retarder 38 may be of stainless steel. Herein electrical current is passed through conductors 37 to heating element 39 to maintain heat retarder 38 at a temperature range from 35° to 50° E below the desired operating temperature. Electrical current is passed through conductor 35 to heating element 31 to heat conductor 36, said current being controlled by thermistor 33 such that thermistor 33 is maintained at the desired operating temperature of hot die 32. The junction between heat retarder 38 and heat conductor 36 thereby serves as a heat barrier, and heat is conducted from heating element 31 down to the hot die 32.

With this method and apparatus of control, it is possible to maintain a very constant temperature of hot die 32, such a temperature being required to transfer the magnetic oxide from the tape 20 to the card 10. The combination of the heat barrier layer 29 and the heat barrier between elements 38 and 36 together with the insulating effect of air bag 50 enables the heat element 31 to rapidly bring hot die 32 up to operating temperature after it has been momentarily cooled by transferring heat to the tape 20 and card 10. This arrangement permits very rapid repetition of the stamping operation.

SUPPORT ANVIL

Referring again to FIGS. 2 and 4, the support anvil 40 will next be described. Said anvil comprises an anvil facing 44, a resilient pad 42, and the rigid support anvil 40. Support anvil 40 is fixedly attached to base 46, with said resilient pad being sandwiched between the anvil 40 and anvil facing 44. For example, the facing 44 may be of hardened spring steel, the resilient pad 42 may be of 90 Durometers, 1/16-inch urethane rubber, and the rigid support 40 of steel. The spring and resilient layers 44, 42 compensate for waviness or uneven thickness or parallelism of card 10, and cause the top surface of card 10 to be parallel to the bottom surface of hot die 32 when pressure is applied.

PUNCH RAM

Referring now to FIG. 2 in connection with FIG. 3, the punch ram will be described.

As heretofore noted, the punch ram 60 is mounted for movement in a vertical direction to raise and lower the hot stamp punch 30 with respect to the anvil 40.

Figure 3:
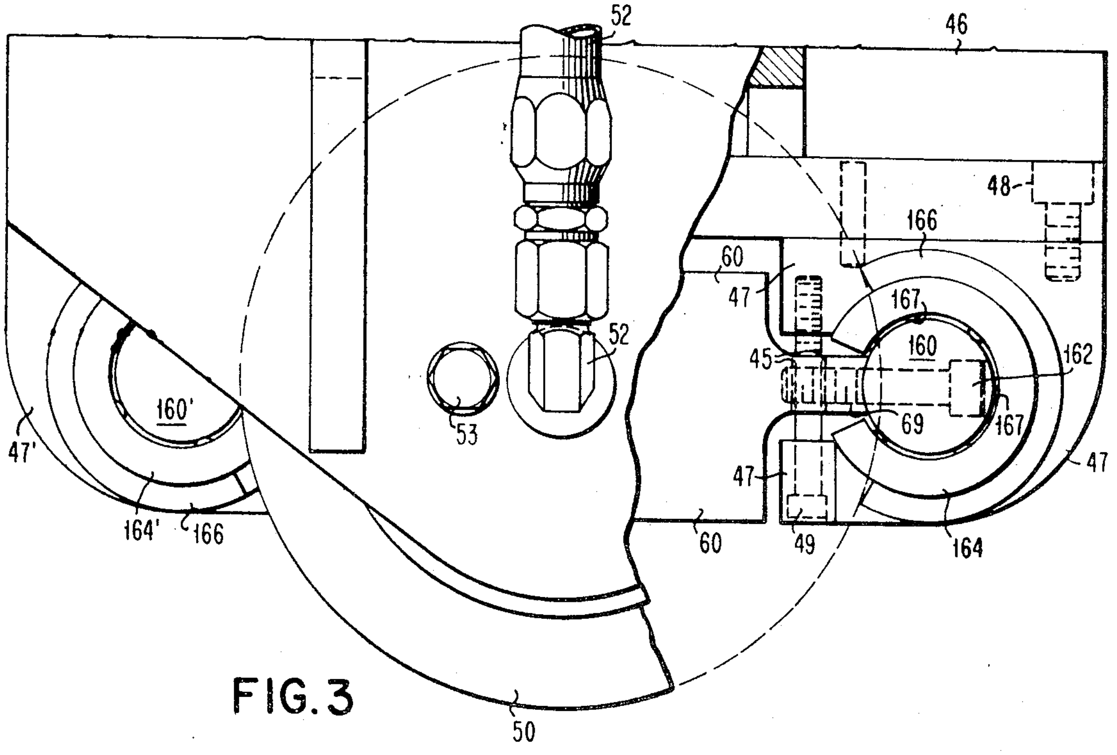
FIG. 3 is a partially cutaway top view of the punch housing, air spring, and base of FIG. 2.

Referring to FIG. 3, right bearing housing 47 is attached to base 46 by mounting screws 48. Mounted within bearing housing 47 is linear bearing 164 carrying ball bearings 167, said linear bearing 164 being keyed into position by bearing key ring 166. Bearing adjustment screw 49 is mounted within the bearing housing 47 and is adjustable to control the rolling force of roller bearings 167 against linear bearing shaft 160. Linear bearing shaft 160 is mounted to punch housing web 69 by mounting screw 162, said web serving as a connection between said shaft 160 and the punch housing 60. Web 69 contains a slot 45 through which the adjustment screw 49 passes.

As the punch housing 60 is raised and lowered, shaft 160 moves along its axis within linear bearing 164. Similarly, linear bearing shaft 160′ is attached to the ram 60 by web 69′ and rides within linear bearing 164 which is keyed to bearing housing 47′ by key 166′. The force in linear bearing 164′ is adjustable by adjusting screw 49′.

By the above described arrangement, the vertical motion of the hot die 32 is maintained within a very precisely defined vertical plane.

AIR SPRING

Referring again to FIG. 3 in connection with FIGS. 2 and 4, the air spring for accurately controlling the pressure on the card 10 will be described. Said pressure on the card is achieved by the use of a closed pressurized system of air. An air bag 50 is located between base 46 and ram 60, being attached to each by mounting screws 53 and 54, respectively. Pressure bag 50 is attached to an air tank (not shown) by closed system 52 without valving. As ram 60 is moved vertically, in a manner to be described hereafter, a constant force is applied by the air spring 50 against surface 61 of ram 60. This force is transmitted through the hot die 32 to tape 20 and card 10 when the ram 60 is at its lower position.

RAM ACTUATING CAM AND CLUTCH MEANS

Referring now to FIGS. 2 and 4, a preferred embodiment of the cam and clutch apparatus for actuating or controlling the vertical position of the punch ram 60 (and hot stamp means 30) will be described.

Herein, rotatably mounted on shaft 63 is cam follower 62. Shaft 63 is mounted to the ram housing 60 through an eccentric bearing 64. Adjusting screw 67 passes through slot 68 in eccentric adjustment plate 65 into the punch ram 60, and may be loosened to permit rotation of eccentric 65 in order to rotate eccentric bearing 64 to adjust the vertical position of shaft 63 within ram 60, and thus the limits of the vertical motion of cam follower 62 and ram 60.

One type of a half-revolution clutch for rotating shaft 70 will next be described. Obviously, other types of clutches may be used. Fixedly attached to driven shaft 70 is cam 66, which shaft is mounted to base 46 by bearing 71. Shaft 70 is keyed to clutch release ring 72 and clutch cam 88 by key 76 and 75, respectively. Cam bearings 74 are mounted in slots in clutch bearing race 73. Said bearings 74 are held within said slots between clutch cam 88 and clutch housing 79. Rotation of clutch cam 88 within the bearing race 73 selectively forces bearing 74 into and out of contact with the clutch housing 79. Clutch housing 79 is mounted on shaft 103 which rotates within bearing 102, which bearings are mounted to base 46. Drive belt 100 is attached to a motor (not shown) to continuously drive the clutch housing 79.

Start solenoid 80 and dwell solenoid 81 are mounted to plate 89, which plate 89 is fixedly attached to base 46 by screw 86. Start solenoid arm 82 is attached to start solenoid lever 84, which lever is fixed to rotate about pin 87. Dwell solenoid arm 83 is pivotedly attached to the dwell solenoid lever 85, which lever is mounted for rotation about pin 86.

Clutch actuator spring 77 is attached to clutch release ring 72 at pin 92, and to clutch bearing race 73 at pin 91. Clutch actuator pin 78 is mounted on the bearing race 73.

With start solenoid 80 in the position shown in FIG. 2, arm 84 engages pin 78. In this position, cam 88 is positioned such that bearings 74 do not contact cam housing 79, and shaft 70 remains stationary while shaft 83 is rotated by belt 100. Ram 60 is in the upward position shown in FIGS. 2 and 4. Upon actuation of start solenoid 80, arm 82 is drawn upwards and lever 84 disengages pin 78. Thereupon, spring 77 causes shaft 70 and housing 79 to rotate with respect to each other, forcing bearings 74 to lock cam 88 to housing 79. While thus locked shaft 70 is driven with shaft 103 for one-half of a revolution:

that is, until pin 78 engages arm 85, which arm 85 will be in a raised position (not shown).

As pin 78 engages arm 85, clutch bearing 88 is caused to rotate with respect to housing 79 until bearings 74 no longer lock engage housing 79 to the clutch cam 88 and, through key 75, to shaft 70. In this position, ram 60 is in the lower position (not shown), with the force of air spring 50 being transmitted to tape 20, card 10 and anvil 40 through hot die 30. Upon actuation of the dwell solenoid 81, shaft 70 is caused to rotate one-half of a revolution until it is stopped by pin 78 engaging arm 84, which arm will have been reset to the lower position by solenoid 80.

Thus the vertical movement of the hot anvil is controlled by an eccentric cam driven by a motor through a one-half revolution clutch. The cam 66 allows the hot anvil 30 to go down to the low point of the cam with the full force of the pressure in air spring 50. The dwell time of the hot anvil 30 on the tape 20 in card 10 is accurately controlled by circuit breaker (not shown) timing of solenoid 81.

When a card is in place at the work station, a switch (not shown) is made in parallel with a circuit breaker (not shown) to pick solenoid 80, permitting the cam 66 to be driven to its low point through the half revolution clutch 79 and shaft 70, whereupon rotation is stopped by solenoid 81. At a measured time thereafter, the second one-half revolution is initiated, to achieve very accurate control of the dwell time of hot die 32 at its lower position.

While the invention has been particularly shown and described with reference to a preferred embodiment thereof, it will be understood by those skilled in the art that various changes in form and details may be made therein without departing from the spirit and scope of the invention.

What is claimed is:

1. A hot stamping apparatus, comprising:
   - a base,
   - anvil means fixedly attached to said base for supporting a workpiece,
   - hot stamp means mounted to said base for movement towards and away from said anvil for applying pressure and temperature to said work piece,
   - said hot stamp means comprising
     - a heat retarding portion,
     - a heat conducting portion,
     - a hot die portion,
     - said conducting portion being mounted between said retarding and die portions,
       - first heating means for heating said retarding portion to a first temperature range,
       - temperature sensing means for signalling the temperature of said die portion,
       - second heating means responsive to said sensing means for heating said conducting portion to a second temperature range;
   - clutch and cam means responsive to power means for actuating said stamp means and for controlling the time of application of said pressure and temperature to said work piece, and
   - air spring means applying a constant force against said stamp means for controlling the pressure applied by said stamp means to said work piece.

2. In a hot stamping apparatus, a hot punch, comprising:
   - heat retarding means,
   - heat conducting means comprising opposite surfaces, one surface forming a thermal interface surface with said heat retarding means and the other forming a hot die surface;

means for heating said retarding means to a first temperature to retard conduction of heat across said interface surface away from said hot die surface, temperature sensing means for measuring the temperature of said conducting means, and means responsive to said sensing means for heating said conducting means to a second temperature.

3. The hot punch of claim 2 wherein said heat conducting section further comprises a hot die portion of hard, wear resistant material.

4. An apparatus for transferring a magnetic layer from a carrier to a substrate under controlled conditions of temperature, pressure, and time, comprising:

a support anvil, hot stamp means cooperating with said anvil for applying pressure and heat to said carrier and substrate, said stamp means being a unitary block comprising at least one heat retarding section and one heat conducting section, first heating means for heating said heat retarding section to a first temperature, temperature sensing means for measuring the temperature of said heat conducting section, second heating means responsive to said sensing means for heating said heat conducting section to a second temperature, clutch and cam means for controlling the position of said stamp means with respect to said anvil, and air spring means applying a constant force against said stamp means for controlling the pressure applied by said stamp means to said carrier and substrate, whereby the conditions of pressure, temperature, and time at a work station are precisely controlled.

5. An apparatus for transferring a magnetic layer from a carrier to a substrate under controlled conditions of temperature, pressure and time, comprising:

a support anvil, hot stamp means cooperating with said anvil for applying pressure and heat to said carrier and substrate, said stamp means being a unitary block comprising at least one heat retarding section and one heat conducting section, a support anvil including a unitary block of a first layer of a hard resilient material between a second layer of hard, spring material and a third layer of rigid material, said third layer having a surface parallel to the surface of said hot stamp, first heating means for heating said heat retarding section to a first temperature, temperature sensing means for measuring the temperature of said heat conducting section, second heating means responsive to said sensing means for heating said heat conducting section to a second temperature, clutch and cam means for actuating said stamp means, and air spring means for controlling the pressure applied by said stamp means, whereby the conditions of pressure, temperature, and time at a work station are precisely controlled and any uneven thickness or non-parallelness of said substrate is compensated for by the spring and resilient materials.

6. An apparatus for applying a precisely controlled force and temperature for a precisely controlled time to a work piece comprising anvil means fixedly attached to a base for supporting said workpiece, punch housing means mounted to said base for movement in one plane towards and away from said anvil means, cam means rotatably mounted to said base and cam follower means rotatably mounted to said punch housing means for controlling the position and movement of said punch housing means in said one plane, air spring means mounted to said base for imparting a constant force against said punch housing means towards said anvil means;

means for driving said cam means, and stamp means fixedly attached to said punch housing means for applying pressure to said workpiece, said stamp means comprising:

heat conducting means having a hot die surface means for applying heat and pressure to said workpiece, heat retarding means;

temperature sensing means for measuring the temperature of said conducting means, first heating means under the control of said temperature sensing means for heating said conducting means, second heating means for heating said heat retarding means;

said heat retarding means being in thermal contact with said heat conducting means for retarding the conduction of heat in said heat conducting means away from said hot die surface means, whereby each said workpiece may be subjected to precisely controlled conditions of pressure and time and whereby a precisely controlled and essentially constant temperature is applied to said workpiece.

7. A hot stamp apparatus, comprising hot die means for applying heat to a workplace, sensing means for measuring the temperature of said hot die means, heat conducting means for conducting heat to said hot die means, heat retarding means in thermal contact with said heat conducting means for retarding the conduction of heat in said heat conducting means away from said hot die means, first heating means for heating said heat retarding means, second heating means responsive to said sensing means for heating said heat conducting means, whereby heat is applied to a workplace for heating a plurality of workpieces in rapid succession to a precisely controlled and constant temperature.

* * * * *